Patented Nov. 18, 1952

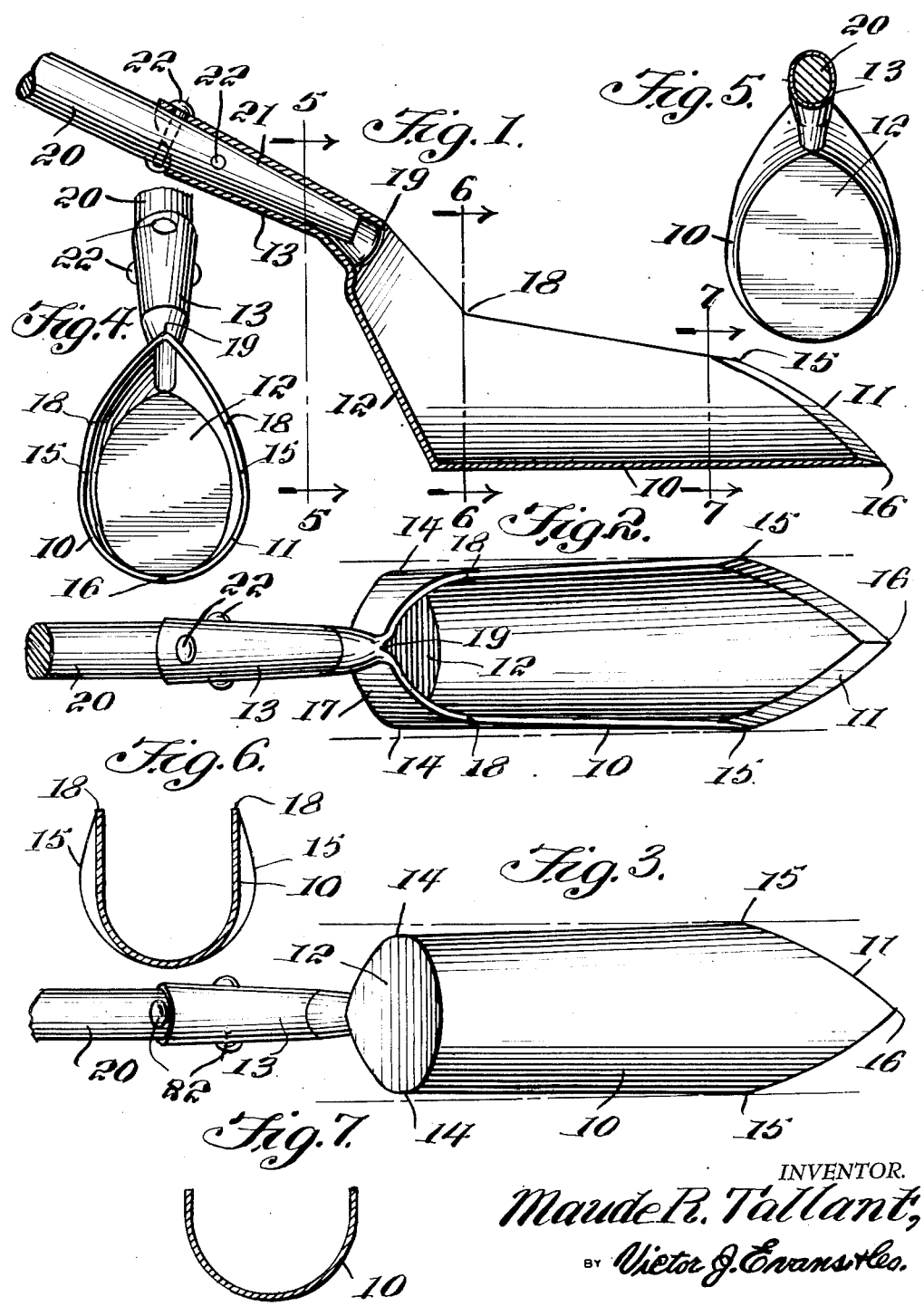

2,618,501

UNITED STATES PATENT OFFICE 2,618,501

IRRIGATION DITCH OPENER

Maude R. Tallant, Grandview, Wash.

Application November 2, 1949, Serial No. 125,069

1 Claim. (Cl. 294—55)

This invention relates to soil removing and digging implements particularly of the type used for removing soil in substantially inaccessible places, and in particular a trowel-like blade substantially semi-circular in cross section, provided with a V-shaped sharpened outer edge with a sloping rear end and having a handle receiving ferrule on the upper end of the rear portion or back.

The purpose of this invention is to provide a scoop like implement for forming irrigation ditches where it is difficult to use power tools.

Trowel-like blades have been provided on shovels and digging implements of different types but for opening irrigation ditches it is difficult to cut through the soil and at the same time withdraw the soil with the implement. With this thought in mind this invention contemplates an irrigation ditch opener in the form of a tubular or semi-circular blade having a V-shaped sharpened outer end and an offset handle wherein the blade may be forced into an irrigation ditch and the soil removed by the implement withdrawn therewith.

The object of this invention is, therefore, to provide means for forming a digging implement whereby the implement may be forced into substantially inaccessible places and particularly where the use of power tools is substantially impossible and wherein the implement is shaped for convenient handling.

Another object of the invention is to provide a soil digging and removing trowel or implement in which the inner end is shaped to prevent soil caking therein.

A further object of the invention is to provide a soil digging and removing implement of the tubular type which is of a simple and economical construction.

With these and other objects and advantages in view the invention embodies a digging implement having a substantially tubular body with a sharpened outwardly tapered outer end and having a sloping inner end with a handle receiving ferrule extended therefrom.

Other features and advantages of the invention will appear from the following description taken in connection with the drawings wherein:

Figure 1 is a longitudinal section through the blade of the implement with the end of a handle shown in the ferrule thereof in elevation.

Figure 2 is a plan view of the body or blade of the implement.

Figure 3 is a similar view looking upwardly toward the under side of the implement.

Figure 4 is an elevational view looking toward the outer or open end of the implement.

Figure 5 is a section taken on line 5—5 of Figure 1 showing the opposite or inner end of the implement.

Figure 6 is a cross section through the blade or body of the implement taken on line 6—6 of Figure 1.

Figure 7 is a similar section taken on line 7—7 of Figure 1.

Referring now to the drawings wherein like reference characters denote corresponding parts the irrigation ditch opener or implement of this invention includes a body 10 having a beveled V-shaped outer cutting end 11, a sloping inner end 12 and a handle receiving ferrule 13.

The body portion 10 is substantially semi-circular in cross section with the outer surface tapering from the inner end or heel as indicated by the numeral 14 to the outer sharpened end or toe 11. The outer end of the body is cut away from the point 15 to the tip or point 16 and the inner surface thereof is beveled providing the cutting edge 11. The side walls of the body 10 extend continuously around providing a short tubular section 17 in which the sloping end 12 is positioned and the ferrule 13 extends from the upper part of the tubular section, as illustrated in Figure 1. The side walls of the body slope upwardly from the point 15 to a point 18 and from the point 18 arcuate edges extend upwardly to the end of the ferrule as indicated by the numeral 19.

A handle 20 having a tapering lower end 21 is secured in the ferrule 13 by rivets 22.

With the body of the tool or implement formed in this manner and suspended at the end of a handle substantially 46 inches long the tool or implement may readily be used for opening irrigation ditches in places where it is substantially impossible to use a power actuated ditch digger or tool.

The sharp forward end facilitates forcing the tool through hard ground, roots and the like and the sloping back or inner end prevents soil packing in the scoop or body portion. The sloping side surfaces of the body eliminate suction and thereby facilitate withdrawing implements with soil and the like therein.

It will be understood that the scoop or blade and handle may be provided in different sizes so that the device is adapted for removing dirt or opening ditches or troughs for various purposes.

It will be understood that modifications may be made in the design and arrangement of the parts without departing from the spirit of the invention.

What is claimed is:

In an irrigation ditch opening trowel, the combination which comprises a substantially tubular body with parts of the upper portion thereof open wherein the intermediate portion of the body is substantially semi-circular in cross section, said body having a V-shaped forward end with the inner surfaces thereof beveled providing sharp cutting edges on the outer wall surface, said body also having an upwardly and rearwardly sloping rear end with the outer wall surface of the body tapering outwardly from the rear end to the V-shaped forward end and a handle receiving ferrule integral with the side portions of the body and extended from the upper part of the rear end with the top edge of the outer wall surface of the body sloping upwardly from the upper end of the cutting edges to a point opposite to the medial position of the rear end and the remainder of the top edge of the outer wall surface of upwardly inclined arcuate formation and merging into the said ferrule, and a handle extended from said body with the end thereof secured in the said ferrule.

MAUDE R. TALLANT.

REFERENCES CITED

The following references are of record in the file of this patent:

UNITED STATES PATENTS

| Number | Name | Date |
|---|---|---|
| 94,303 | Gore | Aug. 31, 1869 |
| 668,982 | Covel | Feb. 26, 1901 |
| 1,711,566 | Jacobs | May 7, 1929 |
| 2,141,007 | Meeh | Dec. 20, 1938 |
| 2,342,436 | Stuart | Feb. 22, 1944 |